(12) United States Patent
Holt

(10) Patent No.: US 6,529,196 B1
(45) Date of Patent: Mar. 4, 2003

(54) EFFICIENT STROKING OF VECTORS WITH ARBITRARY ENDPOINTS

(75) Inventor: Jeffrey J. Holt, Madison, AL (US)

(73) Assignee: 3Dlabs Inc. Led., Hamilton (BM)

( * ) Notice: Subject to any disclaimer, the term of this patent is extended or adjusted under 35 U.S.C. 154(b) by 1180 days.

(21) Appl. No.: 08/825,259

(22) Filed: Mar. 27, 1997

Related U.S. Application Data

(63) Continuation of application No. 08/432,029, filed on May 1, 1995, now abandoned.

(51) Int. Cl.[7] .............................................. G06T 11/20
(52) U.S. Cl. ...................................................... 345/443
(58) Field of Search ................................ 345/440, 441, 345/442, 443; 382/266

(56) References Cited

U.S. PATENT DOCUMENTS 4,939,671 A * 7/1990 Sasser ......................... 395/143

OTHER PUBLICATIONS

Foley et al., *Computer Graphics: Principles and Practice, Second Edition*, 1993, pp. 72–79.*

* cited by examiner

*Primary Examiner*—Stephen S. Hong
(74) *Attorney, Agent, or Firm*—Bockhop & Reich, LLP

(57) ABSTRACT

An improved device, of the type utilizing a display having pixels identified by a two-axis coordinate system, displays line segments referenced to the same coordinate system under control of a digital computer. The coordinate system, for example, having standard rectangular X and Y Cartesian coordinates, is configured so that each pixel lies at the intersection of a coordinate line from each of the axes. The improvement has an arrangement for determining as a major axis the axis of the coordinate system with respect to which the line moves most, and for defining the other one of the axes as the minor axis. For each major axis coordinate line crossing of the line segment, a pixel selection arrangement selects for display a pixel that both lies on the major axis coordinate line and has a minor axis coordinate that is closest to the line segment. In a further embodiment, the pixel selection arrangement includes a tie breaker for selecting for display, in accordance with a uniform rule, between two minor axis coordinates equidistant to the line segment. In a further embodiment, a second uniform rule determines whether to select a pixel for display when an end of the line segment lies exactly on the major coordinate line of a pixel. The second uniform rule selects for display one of the first and last pixels of a line segment unless the line segment is isolated and unless the line segment lies at a specified end of a series of connected segments.

12 Claims, 5 Drawing Sheets

EFFICIENT STROKING OF VECTORS WITH ARBITRARY ENDPOINTS

This is a continuation of application Ser. No. 08/432,029, filed May 1, 1995, now abandoned.

TECHNICAL FIELD

The present invention relates to video controllers, and more particularly to graphics processors that process line drawing requests for display of graphics.

BACKGROUND ART

There are a variety of systems known in the art for selecting which pixels should be displayed, in the course of operation of digitally based graphics processors, for displaying line segments. The systems generally must result from a compromise of the conflicting goals of speed on the one hand and accuracy on the other. A well-known system employs the Bresenham algorithm, which is relatively efficient in handling line segments having ends coinciding with pixel locations. In situations where line segments have ends that do not coincide with pixel locations, however, the problem is more difficult. Such segments may often be identified by floating point coordinates. Moreover, relatively difficult situations arise for a display system when there are many connected line segments having lengths that are small compared to the distance between pixels. These situations are not addressed by the Bresenham algorithm.

SUMMARY OF THE INVENTION

In accordance with a preferred embodiment of the invention there is provided an improved device, of the type utilizing a display having pixels identified by a two-axis coordinate system, for displaying line segments. The coordinate system, for example, having standard rectangular X and Y Cartesian coordinates, is configured so that each pixel lies at the intersection of a coordinate line from each of the axes. The device is of the type for displaying a line segment referenced to the same coordinate system and the display operates under control of a digital computer. The improvement has an arrangement for determining as a major axis the axis of the coordinate system with respect to which the line moves most, and for defining the other one of the axes as the minor axis. A means is provided to identify the places where the major coordinate line of a pixel crosses the line segment to be displayed. There is a pixel selection arrangement operable, with respect to each crossing found by the preceding means, for selecting for display a pixel that both (i) lies on the major axis coordinate line at the crossing and (ii) has a minor axis coordinate that is closest to the line segment. In a further embodiment, the pixel selection arrangement includes means for, in the course of determining the pixel having a minor axis coordinate that is closest to the line segment, breaking a tie between two pixels by making a determination, in accordance with a uniform rule, to select for display one of them. In processing a line segment found to start or finish exactly on the major coordinate line of a pixel, so that there is no crossing of such coordinate line with the line segment, in a further embodiment, there is applied a second uniform rule to determine whether to select the pixel for display. The second uniform rule includes selecting for display one of the first and last pixels of a line segment with a possible exception in the case of a single line segment or a segment at a specified end of a series of connected segments. Related methods are also provided.

DETAILED DESCRIPTION OF SPECIFIC EMBODIMENTS

Disclosure generally pertinent to the context of the present invention is contained in the following related applications, all filed on the same day as the application herewith, and having the same assignee as the present application: "Apparatus and Method for A High-Performance Video Controller," Ser. No. 08/432,106, now U.S. Pat. No. 5,799,204 for an invention of William Steve Pesto, Jr.; "Vertex List Management System," Ser. No. 08/432,314, now U.S. Pat. No. 5,801,714 for an invention of Jeffrey J. Holt; "Video Stream Data Mixing for 3D Graphics Systems," Ser. No. 08/431,821, now U.S. Pat. No. 5,831,637 for an invention of David W. Young and Jeffrey J. Holt; "FIFO Logical Addresses for Control and Error Recovery," Ser. No. 08/432,313, now U.S. Pat. No. 5,760,792 for an invention of Jeffrey J. Holt and David W. Young; "Direct Access to Slave Processor by Unprotected Application Using Context Saving and Restoring," Ser. No. 08/431,820 for an invention of David W. Young; and "System and Method for Controlling A Slave Processor," Ser. No. 08/432,272, now U.S. Pat. No. 5,878,216 for an invention of David W. Young and Jeffrey J. Holt. These related applications are hereby incorporated herein by reference.

I. ARCHITECTURE

Figure 1:
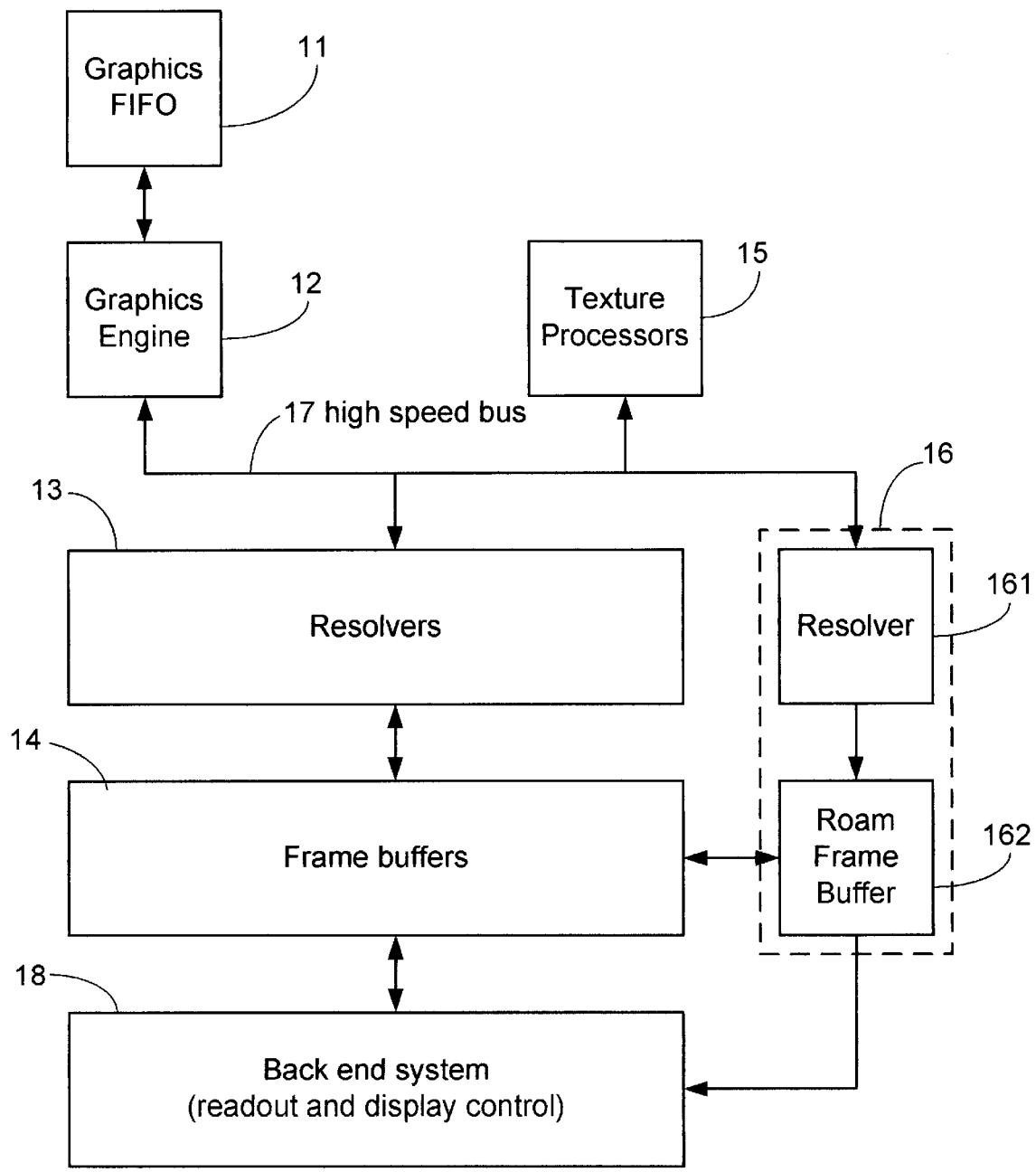
FIG. 1 is a block diagram of showing modules of a video graphics processor-controller in accordance with a preferred embodiment of the present invention.

A preferred embodiment of the present invention has been implemented in a graphics controller-processor having the general structure shown in FIG. 1. This embodiment is suitable for use with computers, such as those utilizing the Intel family of 80×86 processors (including the Pentium), running an operating system such as Microsoft Windows NT, designed to communicate over a PCI (Peripheral Component Interchange) Local Bus, pursuant to the PCI Local Bus Specification version 2.0 (Apr. 30, 1993) published by PCI Special Interest Group, M/S HF3-15A, 5200 N.E. Elam Young Parkway, Hillsboro, Oreg. 97124-6497, which is hereby incorporated herein by reference. However, the embodiment may also be configured, for example, to operate in an X-windows Unix environment, and on other buses, such as VL (VESA local bus). There are different implementations of this embodiment's architecture that may have reduced functionality and/or plane sets.

The architecture can be broken down into six basic subsystems. Of these two are optional. The basic system has a graphics engine 12 that accepts requests via a FIFO buffer 11. These requests are broken down by the graphics engine 12 into pixel requests, which are written over a wide high speed bus 17 to a set of resolvers 13, which in turn control reading and writing of the frame buffer 14. The back end subsystem 18 reads the frame buffer and displays it on the screen of a suitable monitor.

The texture processors 15 and roam processor 16 are optional subsystems. The roam processor subsystem includes its own resolvers 161 and roam frame buffer 162.

Figure 2:
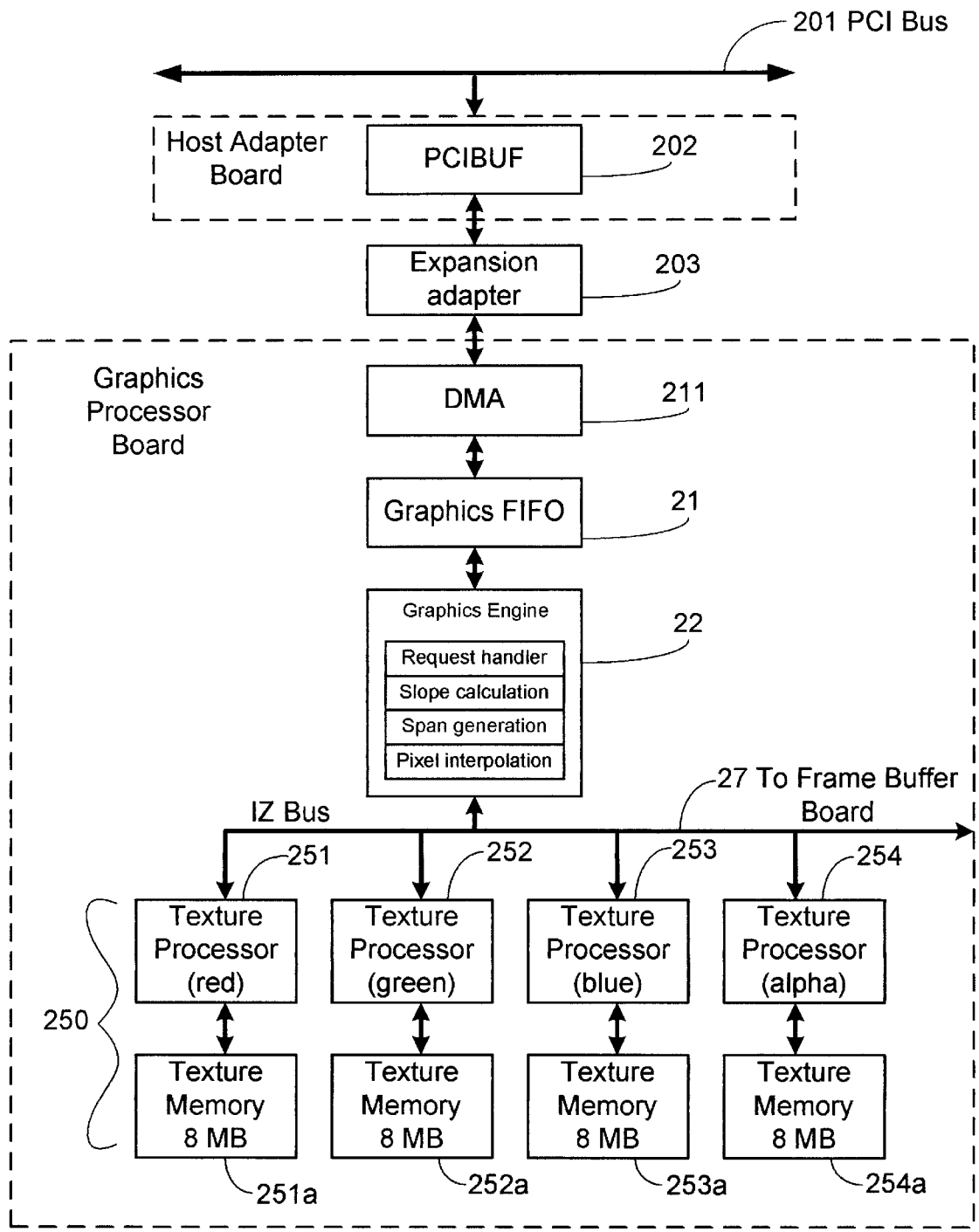
FIG. 2 is a block diagram of a graphics processor system in accordance with a preferred embodiment of the present invention.
Figure 3:
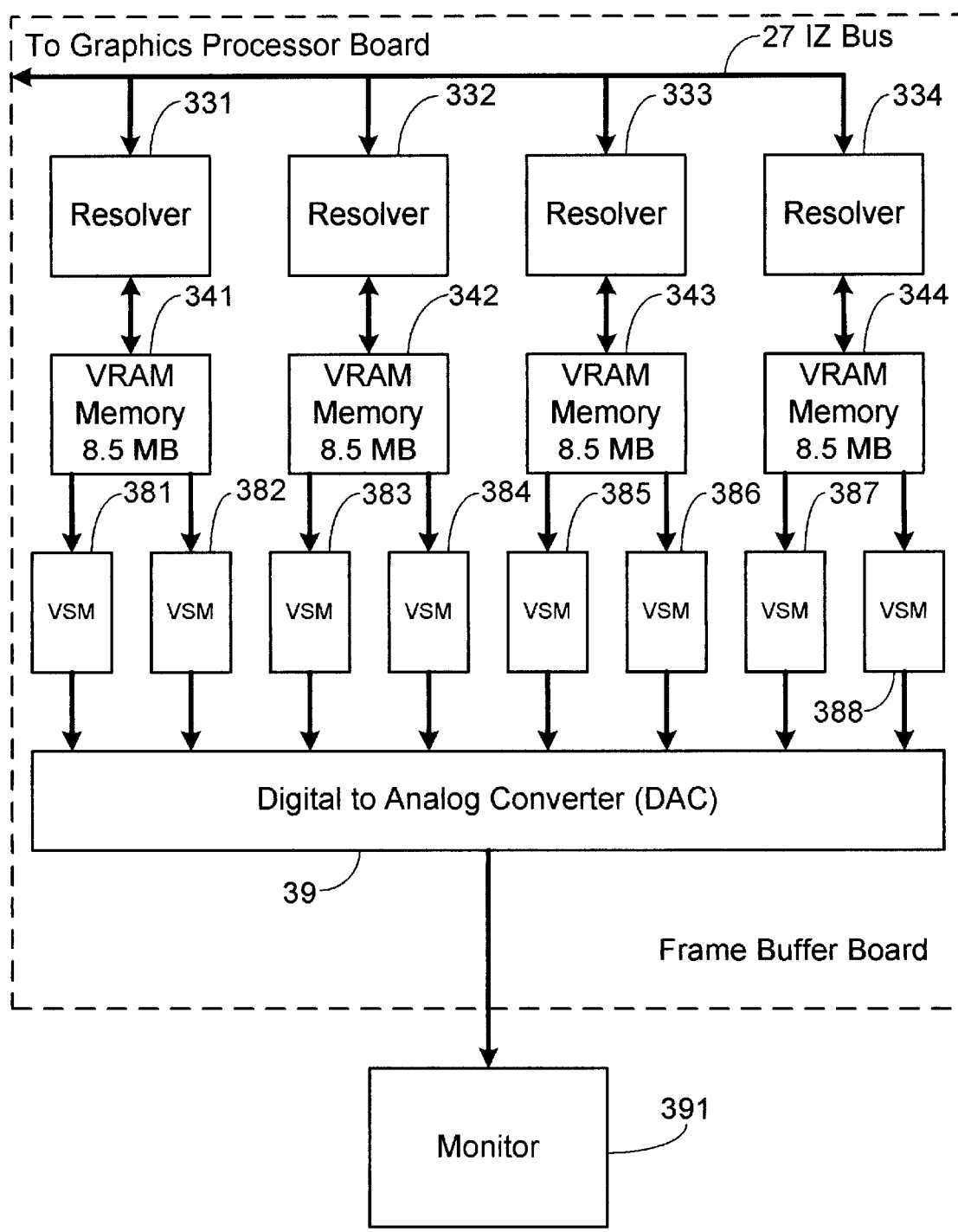
FIG. 3 is a block diagram of a frame buffer system in accordance with a preferred embodiment of the present invention.

FIGS. 2 and 3 are more detailed block diagrams of a graphics processor system and a frame buffer system in accordance with the embodiment of FIG. 1 and are referred to in the discussion below. The rendering subsystem includes the PCI buffer 202, which is an ASIC, the DMA ASIC 211, graphics FIFO 21, and 10 graphics engine ASIC 22. Rendering is the process of drawing triangles, lines, and line strings. The rendering subsystem also performs region fill operations, but expands, and blit operations. Software on the host processor performs the necessary 3D transform and lighting calculations. These calculations result in vertex data which consists of coordinate (X,Y,Z) and color information (R,G,B,A). The host computer typically sends the vertex data to a buffer in main memory.

The vertex data enters the rendering subsystem through the PIC bus interface in the PCI buffer ASIC 202. The PCI buffer 202 ASIC provides an internal FIFO to allow PCI bus burst transfers. It also provides an interface to the expansion cable.

The DMA ASIC 211 is a multichannel, Direct Memory Access (DMA) engine capable of burst transfer for lengths of up to 4 MB. The system software uses the DMA ASIC to transfer vertex data from main memory of the host computer to the graphics FIFO 21.

Graphics Engine

The graphics engine ASIC 22 is the main graphics processor and the core of the rendering subsystem. It takes vertex data from the graphics FIFO 21 and produces rendered spans of pixel data. The graphics engine ASIC 22 sends the data to the frame buffer subsystem over a high speed pixel path called the Image/Z (IZ) bus 27.

The graphics engine uses for major logic blocks to perform the pixel rendering. They are: (1) request handler, (2) slope calculation, (3) span generation, and (4) pixel interpolation.

Request Handler. The request handler monitors the output of the graphics FIFO 21 for data. When data arrives, the request handler analyzes it and writes it to an appropriate processing block. The request handler routes vertex data for triangles and lines to the slope calculation block. Drawing requests (other than vertex data for triangle and lines) such as blits, fills, and bit expands, bypass the slope calculation and span generation blocks. The request handler routes this data directly to the pixel interpolation block.

Slope Calculation. The slope calculation block performs the slope calculation part of the rendering process for triangles and lines. Floating-point math ensures the accuracy of triangle edges. The slope calculation block calculates color derivatives, depth derivatives, and edge slopes. It also adjusts the vertex data to a pixel center for the topmost vertex. The slope calculation block converts all data to a fixed-point format and routes it to the span generation block.

Span Generation. The span generation block performs the span calculation part of the rendering process for triangles and lines. The span generation block determines the leftmost x and y coordinates for each scan line in a triangle. It also calculates the initial color and depth value for each scanline, and routes the data to the pixel interpolation block.

Pixel Interpolation. The pixel interpolation block is common for all graphics drawing requests. For triangle meshes, the pixel interpolation block expands the data from the span generation block to pixel data by successively adding the x-derivative value to the initial color and depth values (z) for each span. The pixel interpolation block also maps the (x,y) address to a linear address before sending the address and pixel data to either the frame buffer or texture subsystem 250 over the IZ bus. The IZ bus 27 is a 64 bit, 256 MB per second bus with a pixel span protocol to facilitate high data throughput. This protocol allows burst transfers of pixel data to occur between the rendering subsystem and the frame buffer subsystem. The maximum burst size is 4096 pixels.

The graphics engine 22 is thus an ASIC that receives requests from a host processor via the PCI system bus 201. Requests are written to graphics FIFO buffer 21 and are read, decoded and executed by the graphics engine 22. Requests include graphic primitives (points, lines and triangles), rectangular fill, get/put pixel data, blits, and control requests.

These requests are broken down into "span" requests— requests to read or write a horizontal sequence of adjacent pixels. The span requests are written to the "IZ" bus 27. For requests which require read back data, such as register read or frame buffer read requests, an output FIFO is provided. Both the input and output portions of FIFO 21 are accessible by programmed or DMA transfers. DMA controllers 211 are provided on board.

The graphics engine also supports a second FIFO interface which can connect to a boardset enabling fast JPEG decompression and display to the frame buffer.

Resolvers

The four resolver ASICs 331–334 on the graphics processor board control the flow of data to and from the frame buffer memory. These resolvers provide a 256-bit frame buffer interface. This wide interface allows the embodiment to achieve a very high drawing bandwidth. The resolvers thus coordinate the movement of data from the frame buffer memory to the video selector and mapper (VSM) ASIC chips 381–388 and DAC 39 (digital to analog converter) in the display subsystem. The graphics engine ASIC 22 sends interpolated pixel data over the IZ bus 27 to the resolver ASIC's IZ input FIFO. The pixel data consists of color (Red, Green, Blue, and Alpha—RGBA)and depth (Z) data. The resolver IZ input FIFO is 128 words deep, so that the resolver can accommodate bursts of pixel data without slowing overall system performance.

The resolver examines pixel data from the input FIFO and determines if it should write the pixel data to the VRAM on the frame buffer board. The resolver performs Z, mask and alpha tests to determine if data should be written.

The resolver may perform an Arithmetic and Logic Unit (ALU) operation on a combination of the source data (data from the graphics engine) and the destination data (data in VRAM). The operations include logical operations, Porter and Duff style alpha blend operations, and OpenGL style alpha blend operations.

The resolver performs several different types of VRAM write cycles including reads, writes, or read-modify-writes. It maximizes memory bandwidth by choosing an appropriate type. The resolver performs block write cycles to maximize performance for window clear and fill requests.

The resolvers 331–334 are thus a set of identical ASICs that accept span requests over the IZ bus 27 and read from or write to the frame buffer formed by VRAM memory chips 341–314. They also perform the following tasks:

masking
alpha test
Z buffering
frame buffer merge (read/modify/write) operations:
   X windows ALU operations
   alpha blend operations Frame Buffer The basic system contains one frame buffer—virtual screens are not supported—but in a typical embodiment 34 MB of memory is provided by 136 VRAMs, each VRAM having 2 megabits of memory. Each pixel in the frame buffer memory in this embodiment then has 126 bits or planes, as follows:

Image planes: double buffered 24 bit RGB planes. These can be used either as 24 bit RGB color, or any of the 3 groups of 8 can be used in pseudo color mode.

WID2: 4 bit single buffered Window ID planes associated with the image planes.

Image VLT context: 3 bit double buffered Video Lookup Table context select.

Overlay planes: double buffered 8 bit pseudo color planes. These planes display if the value is non-transparent (selectable as 0 or 0xFF), otherwise the RGB planes "below" it display.

WID1: 4 bit single buffered window ID planes associated with the overlay planes.

Overlay VLT context: 1 bit double buffered video lookup table context select

Highlight plane: double buffered 1 bit highlight plane if non-transparent (selectable 0 or 1) this will display overriding both the RGB planes and the overlay planes.

WID0: 4 bit single buffered window ID planes associated with the highlight plane.

8 bit single buffered alpha planes which are used by the resolver for alpha blend operations on the image planes Z buffer: 32 bits single buffered. Z buffering can be enabled for writes to any of the planes.

mask planes: 6 mask planes are available. Any combination of 0 or more may be enabled for reads and/or writes. Mask plane 0 is designated as the "user mask plane" and intended for application use.

The WID bits allow window based double buffering on up to 15 different windows independently in each of the three sets of planes. They are also used to specify RGB to VLT routing for the image planes, and are used to allow roam buffer display in a window.

Most writes to the frame buffer are to a single "visual"—ie a single set of planes. For example, visual 2 is the image (RGB) set of planes, and visual 1 is the overlay set of planes.

Certain "implied" data may be written at the same time a write occurs to some visuals. The implied data comes out of a static register in the graphics engine (via the span header) and consists of the control data which is listed with the visible planes above—for example a write to the image planes can also write the WID2 bits and the image VLT context bits. Implied writes may be independently enabled or disabled via write enables.

Note that different implementations of this architecture may contain a subset of the above planes.

Back End

The back end has a set of VSMs 381–388 (Video Selector and Mapper) which drive RAM DACs 39 (Digital to Analog Converters), and the video timing logic. the VSM ASIC receives pixel data from the frame buffer. It selects which buffer (front or back), and which data (image or overlay), to display. The VSM uses the video selection planes to choose a VLT mapping if it decides to display image planes. The VSM sends the mapping result to the DAC on the processor board. The VSMs thus read the appropriate planes of the frame buffer, perform lookup through one of the 8 VLTs, and send RGB to the RAMDACs.

The DAC converts pixel data from the VSM to an analog voltage and sends it to a monitor 391 for display. The integrated DAC contains a Video Lookup Table (VLT) consisting of 256 locations×3 colors (RGB)×10 bits per color used for gamma correction. The DAC also provides a user definable 64×64 pixel hardware cursor.

For each of the three plane sets (highlight, overlay and image) the WID bits associated with those planes are used to index into one of three small lookup tables. A bit in this LUT selects which buffer is to be displayed for that plane set. The LUT associated with the image planes also is used to specify routing between the RGB planes and the VLTs. The overlay VLT context bit is used to select between VLT context O and 1. The image VLT context bits can select any of the 8 VLT contexts available. All VLT contexts are capable of being specified as either pseudo color or true color when driven by the image visual.

Bits in the WID tables are also provided to select the roam buffer, and disable display of the overlay and highlight planes.

Roam Processor Subsystem

The roam subsystem is shown in FIG. 1. (For purposes of simplicity, it is not shown in FIG. 3, but is generally analogous in structure to the frame buffer structure shown in FIG. 3.) This subsystem is effectively an additional frame buffer larger than the actual screen size. This buffer can be roamed in a toroidal fashion within a window in the static frame buffer. The frame buffer has:

image: single buffered RGB planes (24)--
image VLT context (3 bit single buffered)
overlay: single buffered (8)r
overlay VLT context (1 bit single buffered)
highlight: double buffered (2)
mask planes (2)

It has a set of resolvers 161 that are configured as "roamers" connected to the IZ bus 17, the frame buffer 14 as above, and a pixel shifter followed by a set of VSMs (like 381–388) which feed into the digital RGB stream to the RAMDACs 39. Since the VLTs are in the VSMs, the roam buffer has its own set of 8 VLT contexts.

The roam buffer displays through a window defined by the WID bits in the static frame buffer. Each of the WIDs index into their lookup table in the static frame buffer VSMs, and if all three enable the roam buffer, the roam buffer will display. If any do not select roam, roam will not display. This allows static frame buffer pixels to overlay the roam buffer.

Texture Processor

The texturing subsystem 250 is an optional subsystem which interfaces solely through the IZ bus 27. The texturing subsystem 250 logically lies between the rendering subsystem and the frame buffer subsystem. The texturing subsystem 250 comprises four texture processor ASICs 251–254 and 32 MB of texture memory 251a, 252a, 253a and 254a. Each texture processor ASIC performs texturing operations for a single band (red, green, blue or alpha) or texture memory.

The texture processors 251–254 receive two types of setup parameters from the graphics engine 22: one type for triangles and one type for pixel spans within a triangle. The triangle setup parameters consist of texturing control information and texture coordinate derivatives, and the pixel span setup parameters consist of initial texture coordinates. These texturing processors 251–254 correct for perspective during texture coordinate interpolation and thereby reduce image distortion.

The texture memory is capable of storing several sets of mip-mapped textures for subsequent texture mapping. In mip-mapping, multiple-sized versions of a texture are stored. Each version is filtered to account for distance from the viewer. The texture processor chooses eight texels nearest the actual texel value from the nearest two mip maps. The texture processor interpolates these eight texels to produce the actual texel value through the use of trilinear interpolation. The actual texel value replaces or blends with the Gouraud shaded pixel value generated by the graphics engine 22. Finally, the texture processors route the textured pixels to the resolvers 331–334 and the resolvers 331–334 write the textured pixels into the frame buffer 341–344.

When the graphics engine 22 receives textured requests (that is, requests which contain texture coordinates), it sends special span requests to the texturing subsystem 250 over the IZ bus 27. The texturing subsystem 250 intercepts these spans, textures the pixels within it, and then resends the span to the resolvers 331–334. Texture memory 251*a*, 252*a*, 253*a*, and 254*a* looks like frame buffer memory 341–344 to the graphics engine, and is loaded/read back by normal get/put and fill operations.

II. IMPLEMENTATION

Graphics Engine

The graphics engine 22 is request-based, in that it receives requests from a host processor to perform draw, data movement, and control operations affecting the frame buffer. The host processor is responsible for performing all floating point calculations, such as lighting, transformations, etc.

The types of operations performed by the graphics engine are listed below, along with some performance figures for 1.3 and 2 MPix systems:

| Request | Peak Performance |
| --- | --- |
| Vectors | 1.4 M/s (10 pixel) - aliased |
| | 550 K/s (10 pixel) - antialiased |
| BitBlits (masked) | 18 MPix/s/64-planes - |
| BitBlits (non-masked) | 26 MPix/s/64-planes |
| Slow Recfills | 30 MPix/s |
| (with masking, ALU) | |
| Fast Recfills | 400 MPix/s |
| Triangles | 450 K+/s (50 pixel avg.) |
| Expand Bitmap | 32 MPix/s |
| Putblock8 | 32 MPix/s |
| Putblock32 | 25 MPix/s (bus limited) |
| Putblock32/Z | 12 MPix/s (bus limited) |
| Getblock8 | 32 MPix/s |
| Getblock32 | 25 MPix/s (bus limited) |
| Getblock32/Z | 12 MPix/s (bus limited) |
| Load VLTs | 2 Contexts/vertical blank |
| Save/Restore Context | 32 words of data |

Static Frame Buffer

The maximum configuration for the static frame buffer contains a total of 132 planes:

| Description | planes | buffering |
| --- | --- | --- |
| Highlight | 1 | double |
| Overlay | 8 | double |
| Overlay VLT Context | 1 | double |
| Image | 24 | double |
| Image VLT Context | 3 | double |
| Alpha | 8 | single |
| WID | 12 | single |
| Z buffer | 32 | single |
| Mask | 6 | single |

The static frame buffer "stacks" the overlay and highlight visuals on top of the image visual. A selectable value for the highlight and overlay planes is specified as "transparent" allowing the visual(s) below to display. A non-transparent value in the overlay planes will override the image visual. A non-transparent value in the highlight plane will override both the image visual and the overlay visual. Display of both highlight and overlay may be independently disabled via the WID lookup tables. Overlay transparency may also be turned off via the WID LUT.

A total of 8 VLT contexts are supported. Only the first two are accessible by the overlay planes, while all 8 are accessible by the image planes. All contexts may be configured as either pseudo color or true color contexts, and this determines whether the image planes are being used in true color or pseudo color mode.

Hardware Contrast Adjustment is Supported

A hardware cursor is provided. It will support cursor sizes up to 64×64 and 2 planes in depth. One of the two planes is configured as an enable plane.

The frame buffer supports interlaced stereoscopic displays.

Roam Frame Buffer

The optional roam frame buffer contains a total of 40 planes, with the following breakdown:

| Description | Planes | Buffering |
| --- | --- | --- |
| Image | 24 | single |
| Overlay | 8 | single |
| Highlight | 1 | double |
| Image Vlt Context | 3 | single |
| Overlay Vlt Context | 1 | single |
| Mask planes | 2 | single |

III. HARDWARE REQUEST FORMATS

All requests begin with a 32 bit request word. The upper halfword contains the request code, and the lower halfword contains graphics control information. The graphic control information for all graphic requests is the same and as follows:

bits 14:0 these bits map to bits 14:0 of the GE_GCR (graphics engine graphics control register). Under the subhead "Vector Requests" in the section below entitled DRAW REQUESTS, is a description of the various graphics engine registers; there the function of these bits in the context of the GE_GCR is explained.

bit 15 GE_GCR_WE_H GE_GCR write enable If set then bits 14:0 above will be written to the GE_GCR before the request is executed. The GE_GCR will be permanently modified. If this bit is not set the bits currently in the GE_GCR will be used. The write is subject to masking by the GE_GCR_WEMASK register.

The format of control information for non-graphic requests is defined with the requests themselves.

The upper halfword containing the request code is further divided into 3 subfields as follows:

| | |
| --- | --- |
| bit 31 | 0 reserved |
| bit 30 | 0 reserved |
| bit 29 | 1 for requests which return data |
| bit 28 | 1 for protected requests |
| bits [27:24] | major request ID |

| bits [23:16] | vertex format for draw requests request modifier/subrequest code for other requests |

Requests may be fixed length (eg most of the control requests), fixed length dependent on parameters in the request (eg raster placement requests) or variable length (open ended) (eg the vector request). Open-ended requests end with a 1 or 2 word terminator. Terminators vary depending on the particular request.

Requests are further divided into protected and nonprotected requests. Protected requests will not be executed unless they were written to the protected FIFO. Nonprotected requests will execute from either FIFO. Note there is only one physical FIFO, mapped into several addresses. The sync FIFO is considered a protected FIFO, and hence can execute protected requests.

It is intended that for application "direct access" to the graphics processor of this implementation, the applications will be able to write to the nonprotected FIFO, but not the protected or sync FIFOs.

Context switching will be supported at any point in any non-protected request written to the non-protected FIFO. Protected requests or requests written to a protected FIFO are not interruptible.

No support for clipping or clip checking is provided in the graphics engine, apart from the masking planes. X,Y coordinates and window origins are signed, but all generated pixels must end up as valid screen coordinates.

IV. DRAW REQUESTS

There are two main draw requests: E3Vec (vector) and E3Tri (triangle). These requests are open ended and consist of a request header word and then an open ended sequence of vertices. The vertex format is the same for the vector request and the triangle request. The format of the vertex expected by the graphics engine is encoded in the 8 bit "vertex control" field (VCTRL) of the request header word. The VCTRL field specifies both the format of data in the vertex, and the existence of optional data.

There is also a special purpose clipped vector request, E3ClipVec. This request draws one stroke, and has only one data format—there is no vertex control field.

The Graphics Engine processes draw requests the same way regardless of the destination visual selected in the GE_BUFSEL register. A 32 bit RGBA value is generated—this will come from the iterator if shading is being done, or else from the GE_FGCOLOR/BGCOLOR registers. If dithering is enabled, this value will be dithered as described in the application notes, and the 8 bit dither index placed in the low 8 bits of the RGBA value (the "R" field). The G, B and A fields are left as is. This value is written to IZ[31:00]—the low half of the resolver bus. The upper 32 bits of the IZ bus have a Z value placed on it. This comes from the iterator or the GE_Z register, depending on whether Z is included with the vertex.

In the resolver IZ[63:32] is used to perform Z buffering ALWAYS if it is enabled, regardless of the destination visual selected. The destination visual selects the planes to which IZ[31:00] are written. If the destination visual is less than 32 bits, only the lower portion of the IZ bus will be written to it. Alpha operations always use IZ[31:24] as the source alpha, the destination alpha is either the contents of the alpha planes or 0xFF depending on the visual selected.

Vertex Format

The minimum information in a vertex is simply an (X,Y) pair. Optional data is Z, (U,V,S), color (RGB), and alpha.

Thus the maximum is (X,Y,Z,U,V,S,R,G,B,A). This is also the required order for the vertex data. The number of 32 bit words of data required to represent a vertex can be from 1 word (packed X,Y, no optional data) to 20 words (double precision for all data, all optional data included).

The format of VCTRL is as follows:

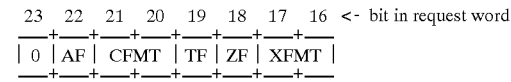

XFMT Data Format for X,Y,Z,U,V,S
Specifies the data format of coordinate data. It is encoded as follows:

| 00 | packed 16 bit for X,Y and U,V (X,U low). Z,S unsigned 32 bit. |
| 01 | 32 bit, signed integer for X,Y,U,V. Z,S are unsigned. |
| 10 | IEEE single precision floating point |
| 11 | IEEE double precision floating point. |

ZF Z Flag
Specifies that Z is included with the vertex. Z always follows X,Y if it exists. Z is a minimum of 32 bits, so is in unsigned 32 bit format even if XFMT is 00. If it is zero then the Z value of pixels generated is considered to be the value in GE_Z for Z buffer operations. If Z is provided with the vertex, Z values will be interpolated along line segments and triangle facets.

TF Texture Flag
Specifies that the request is to be textured. If TF is set, texture coordinates (U, V, S) are included with the vertex and are in the format as specified by XFMT. Note that if XFMT is 0 (packed format) U and V are packed, and S is a 32 bit quantity in the next word. U, V and S coordinates are interpolated along line segments and on triangle facets.

CFMT Color Format
The CFMT field specifies whether color is included with the-vertex, and if so the format of the color data. CFMT is encoded as follows:

| 00 | color/alpha is not inccluded with the vertex |
| 01 | packed R G B A: |

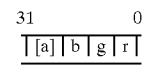

| 10 | single precision floating point in the order R G B [A] |
| 11 | double precision floating point in the order R G B [A] |

Color follows the S coordinate if it exists, else it follows the Z coordinate if it exists, else it follows the (X,Y) coordinate. If color is not supplied with the vertex, segments or facets are drawn in the foreground color. If they are supplied then they are interpolated along line segments, or Gouraud shading is performed for triangle facets. If SHADE_FLAT_H is set in the GE-GCR then shading is inhibited and each stroke or facet is drawn flat shaded in the color of the last vertex received.

AF Alpha Flag
This flag indicates whether alpha is included with the color coordinate. AF is ignored if CFMT is 00. If AF is set, alpha is taken from the high 8 bits of the color word if color is in packed format. For CFMT=10 or 11 alpha is a single or double precision value which follows blue in the vertex. If AF is clear, the alpha value is taken from the foreground color register. In this case the high 8 bits of the packed color are ignored, and alpha will not be in the vertex data for floating point formats. Note that the AF bit does not have any effect on alpha operations-alpha blending, if enabled, will still occur on pixel writes using the alpha value from the foreground register.

Vertex Handling

Vertex data is transformed to internal format as it is read from the FIFO. The transform can be handled differently depending on some of the bits in the graphics control register (GE_GCR).

X and Y coordinates are signed and window relative. If they are in an integer format they are used as is. If they are in a floating point format, and FIX_VER_H is set, they will be truncated before use. If COORD_OFFSET_H is set in the GCR then either 2028 or 4096 will be subtracted from both X and Y before use, depending on OFFSET_4R_H. This is done after derivatives are calculated, so that the derivatives are independent of screen position.

Z is unsigned, and will be clamped to 0 if in floating point format and negative. If Z is not specified, Z from the GE_Z register will be used for any Z operations requested. If Z is specified, it is interpolated for both vector and triangle requests.

U, V and S coordinates are described in the appendix on texture processing.

Color values are used as is if in packed format. For floating point color values, the color components are in the range [0,1]. Internally the graphics engine scales the value to the range [0,255]. If alpha exists it is treated the same as one of the color components.

If dithering is enabled, the color range is different, and color scaling is handled differently. See the application notes on dithering for a discussion on this. Dithering can be applied to both vector and triangle requests.

Vertex Terminators

The vector and triangle requests are open ended, and are terminated by a terminator value as the first data value of a vertex. This value depends on the XF field as follows:

| XF | DATA TYPE | Terminator |
|----|-----------|------------|
| 00 | integer (X,Y) | 0x80000000 |
| 01 | integer X coord | 0x80000000 |
| 10 | float X coord | NaN with exp = 255, bits [22:19] = 1 |
| 11 | double X coord | NaN with exp = 2047, bit 51 = 1 |

Terminators are a single 32 bit value, except in the case of double precision values in which case it is two 32 bit words, where the first is arbitrary (least significant part of the double) and the second word is as above.

Floating point terminators are not completely decoded— the sign bit and part of the mantissa are not used and thus may be arbitrary. The following bit patterns represent the floating point terminators. "x"s represent bits that are arbitrary:

Single precision:

x111 1111 1111 1xxx xxxx xxxx xxxx xxxx

Double precision:

x111 1111 1111 1xxx xxxx xxxx xxxx xxxx xxxx xxxx
    xxxx xxxx xxxx xxxx xxxx xxxx For example, the following hex values would be considered terminators for floating point formats:

| float: | 0x7FF80000 |
| double: | 0x7FF80000 00000000 |

Vector Request

The vector request uses a stroking algorithm to draw a single pixel width line. These lines can be used for weight 0 X windows lines since X does not require any particular pixelization. They cannot be used for width 1 X windows lines, because they do not produce the characteristic "knobbly" thickening and thinning that weight 1 X windows lines produce.

Two different algorithms are used to stroke vectors: the Bresenham algorithm and a new DDA algorithm. The new algorithm lights the closest pixel to a line, including lines with floating point coordinates; that is, the algorithm has subpixel accuracy. The algorithm will thus draw a line or a connected set of lines, attempting to give good results for arbitrary endpoint lines, including lines whose endpoints do not fall on pixel centers. It also attempts to minimize the number of pixels drawn even in an "overstroked" condition—that is, when there are many connected line segments having lengths that are small compared to the distance between pixels.

Figure 4:
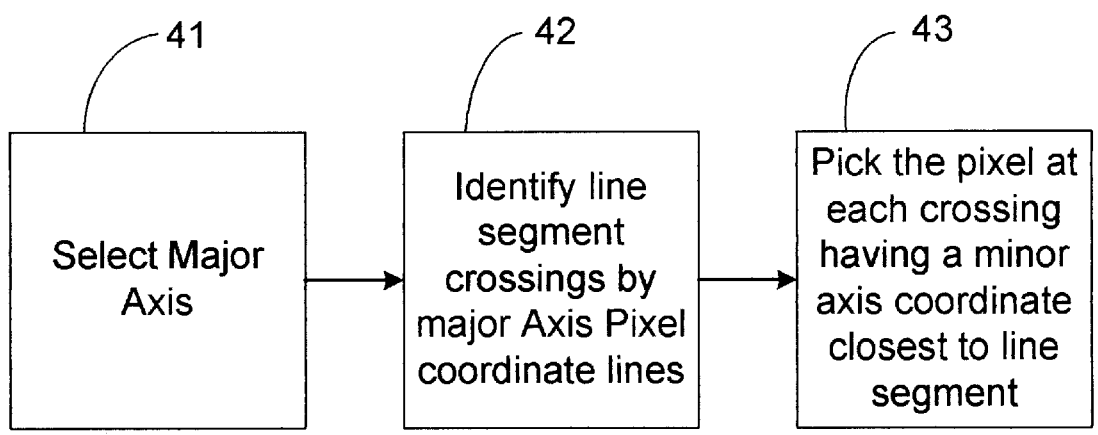
FIG. 4 is a block diagram of the steps utilized by a preferred embodiment of the invention for selecting pixels for display.
Figure 5:
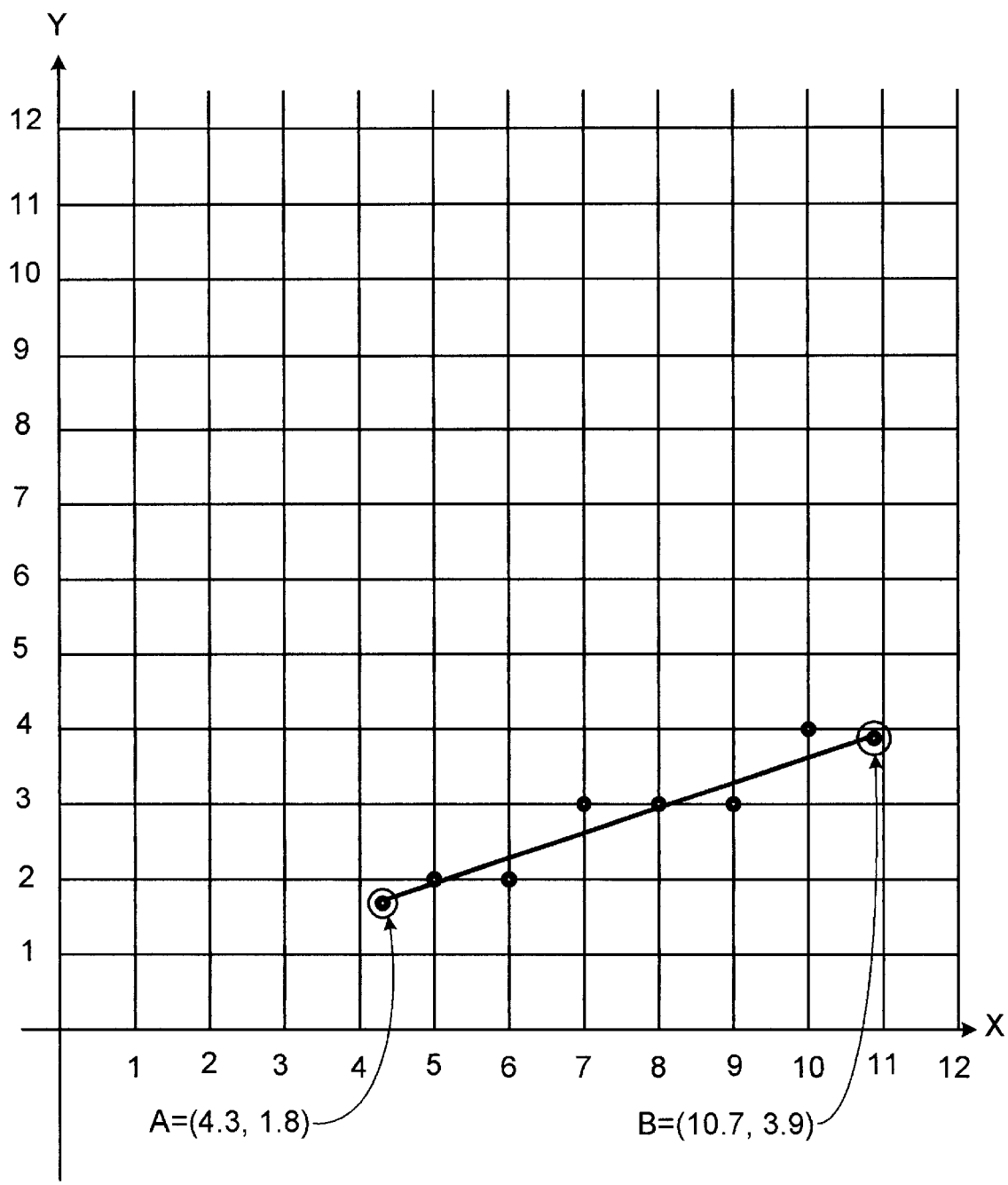
FIG. 5 is a diagram illustrating the operation of the embodiment of FIG. 4 with respect to a line segment.

The new algorithm follows generally the steps shown in FIG. 4, which will be discussed in the context of the example shown in FIG. 5. Under step 41, the "major axis" is selected. The major axis is defined as the axis (x or y) with respect to which the line moves most. If it moves equally in both, either axis can be selected. The axis normal to the major axis is called the "minor axis". In FIG. 5, there is illustrated a portion of a display screen having pixel centers at the intersections of integral X and Y coordinates, so 12×12 or 144 pixels are referenced in the figure. The line segment to be drawn runs between point A, at x=4.3 and y=1.8, and point B, at x=10.7 and y=3.9. It can be seen and readily determined that this line moves primarily in the X direction, so, in this case, the major axis is the X-axis.

Under step 42, there are identified the places where the major coordinate line of a pixel center crosses the line segment being drawn. This is an easy job. For example, in FIG. 5, the major coordinate lines crossing the segment shown are those between point A at x=4.3 and point B at x=10.7. The major coordinate line of a pixel center crosses the line segment at each integral value of x between 4.3 and 10.7, namely, 5, 6, 7, 8, 9, and 10.

Under step 43, with respect to each line crossing found in step 42, a pixel is selected that both (i) lies on the major major axis coordinate line at the crossing and (ii) has a minor axis coordinate that is closest to (or on) the line segment. Thus in FIG. 5, with respect to the crossing of the coordinate line for x=5, the pixel lying on that coordinate line and that is also the closest to the line segment is at the minor axis coordinate of y=2. At the crossing of the coordinate line for x=6, the closest pixel is still at the minor axis coordinate y=2. At x=7, 8, and 9, the closest pixels are at y=3. An at x=10, the closest pixel to the line segment is at y=4. Each of these pixels is identified by a dot in FIG. 5. In the case of a tie between two pixels, either pixel can be displayed, depending on the pixelization rules desired; under one rule, for example, in the case of a tie, the pixel below or to the right will be displayed.

If the line segment starts or finishes exactly on the major coordinate line of a pixel center (and so there is no crossing in step 42), a set of rules can be applied to determine whether to draw the pixel or not. These rules will depend on pixelization requirements. Two example sets of rules for first and last pixels which exactly fall on pixel centers are:
  (a) "X window like" rule: for a single line segment, or the first segment of a connected set of line segments, draw both the first and last pixels. For the second and subsequent segments of a connected set of line segments, do not draw the first, and draw the last.
  (b) "GDI like" rule: always draw the first, never draw the last.

Additional setup time in the graphics engine is required for DDA stroking, and this will impact short vector performance. 10 pixel solid DDA vectors will run at about 50% of the Bresenham rate, 10 pixel shaded color/Z at about 70% the Bresenham rate. For vectors over about 20 pixels the extra setup time will be hidden, so there would be no degradation in performance The algorithm used depends on the state of the GCR. If antialiasing is enabled (VEC_AA_H set), the DDA algorithm is always used. Otherwise if FIX_VER_H is set, the Bresenham algorithm is used, and if FIX_VER_H is clear, the DDA algorithm is used. This is independent of the format of the X,Y coordinate.

Normally a vector request produces a linestring, but if VEC_SEGMENT_H is set in the graphics control register there is an implied disconnect between each pair of vertices, producing a sequence of disconnected segments.

The graphics engine maintains the concept of a "first segment" attribute while stroking vector requests. Normally the first segment of a request has the "first segment" attribute, while subsequent segments do not. If VEC_SEGMENT_H is set, then all segments have the "first segment" attribute. If VEC_CONTIN_SYMB_H is set, then NO segments have the "first segment" attribute (even if VEC_SEGMENT_H is set). "First segments" differ from subsequent segments in the following areas:
  symbology is reset before the segment is drawn
  VEC_DRAW_FIRST_H is ignored, and the first pixel is drawn always
  for anti-aliased lines the AA_V_FBFUNC is NOT used for the first pixel There are two bits in the GCR which define behavior of the vector stroker at the first and last pixels of lines/linestrings. These are VEC_DRAW_FIRST_H and VEC_DROP_LAST_H. If VEC_DRAW_FIRST_H is not set, the first pixel of linestring segments AFTER the first are not drawn. If VEC_DROP_LAST_H is set, the last pixel of all line segments, including first and single segments, are not drawn.

If neither of these bits are set, the graphics engine is in "X windows" mode. If the request produces a linestring the first pixel of segments after the first are not drawn, so that internal vertex pixels are not drawn twice. All pixels of the first segment are drawn. All pixels of segments are drawn if VEC_SEGMENT_H is set.

If both bits are set, the graphics engine is in "Windows" mode, and the last pixel of all segments is dropped. The pixel is dropped even if VEC_SEGMENT_H is set.

These mode bits also affect DDA stroked lines. In this case they operate slightly differently. Pixels are only dropped if the start/endpoint of the segment falls exactly on a pixel center in the major axis. If a segment "crosses" a pixel center, that pixel will always be drawn, even if it is the first or last pixel, and regardless of the state of the two bits. The two bits should be set such that first and last pixels are always drawn for antialiased lines.

E3Vec vector requests can be antialiased with a performance penalty.

Symbology will be applied to vector requests if VEC_SYMB_H is set in GE_GCR. As each pixel for a stroke is generated, the LSB of the symbology mask is checked. If it is a 1 then the pixel is drawn normally. If the symbology bit is O, then there are two possibilities. If BG_WE_H is set in GE_GCR then this pixel is drawn in the color in GE_BGCOLOR. If BG_WE_H is clear in the GE_GCR then the pixel is not drawn. After each pixel is drawn (or not) a specified number of times, the symbology mask is rotated right 1 pixel. Only the number of bits defined in the symbology count register are included in the rotate. The repeat count register specifies the number of pixels drawn before the symbology mask is rotated. The symbology repeat count is not incremented on pixels not drawn due to the VEC_DRAW_FIRST_H/VEC_DROP_LAST_H bits in the GCR.

Symbology is reset to the original loaded values at the start of every request, and also at the start of every segment if VEC_SEGMENT_H is set in the GE_GCR. Symbology reset across requests and segments can be suppressed by setting VEC_CONTIN_SYMB_H in the GCR.

Registers Which Affect the Vector Request
GE_GCR

| | |
|---|---|
| VEC_AA_H | enables antialiasing |
| VEC_SEGMENT_H | vector is segments not linestrings |
| VEC_SYMB_H | symbolize vector |
| VEC_DRAW_FIRST_H | draw first pixel of segments |
| VEC_DROP_LAST_H | don't draw last pixel of segments |
| FIX_VER_H | fix X,Y endpoints |
| SHADE_FLAT_H | each segment is constant color |
| DITHER_EN_H | enables dithering |
| ATST_EN_H | enable alpha test |
| Z_EN_H | enables Z buffering |
| BG_WE_H | enable write of "off" symbolized pixels |
| UMASK_PO_H | selects the polarity for plane O masking |
| UMASR_PLN_EN_H | write enable for user mask plane (visual 8) |
| VEC_CONTIN_SYMB_H | continue vector symbology |
| STERFO_EN_H | stereo addressing mode |
| STEREO_F1_H | stereo field 1 selected |
| STEREO_DITHER_H | stereo dithering mode |
| COORD_OFFSET_H | coordinates are offset |
| OFFSET_4K_H | offset is 4k |
| WRITE_MASK_EN_H | enables masking |
| MASK_EN_H[5:0] | selects which mask planes are used for masking |

GE_GCR_WEMASK
  Selects which bits in the GCR may be modified by the control part of the request word
GE_FGCOLOR this defines the data written for requests which do not include a color as part of the vertex data, and alpha for requests in which alpha is not included in the vertex data.
GE_BGCOLOR defines the color of "off" pixels of symbolized lines if BG_WE_H is set in the GE_GCR.
GE_Z this defines the Z value which will be used for Z buffering if it is enabled, and Z is not included with the vertices.
GE_MISC_DATA this defines "implied" data which will be written to control planes if the appropriate plane enables are set, and the visual is one of 0–5. See section on visuals for description of implied data for each visual.
GE_SYMBOLOGY
GE_SYMB_CTRL
GE_AA_CTRL controls antialiasing parameters
GE_WORG or GE_ROAM_WORG
GE_SWIDTH or GE_ROAM_SWIDTH
GE_DITH_CTRL
GE_TEX_ORG GE_TEX_BCOLOR
GE_TEX_CTRL
GE_ATST_CTRL
  Value and function used for alpha test if enabled
GE_ZFUNC selects the Z buffer function performed if Z buffering is enabled
GE_FBFUNC selects the frame buffer merge function to be performed
GE_BUFSEL selects which visual is written to, plus selects which buffer of the visual, or roam buffer.
GE_IMAGE_PLN_EN plane enables for the true color visual
GE_OL_PLN_EN plane enables for overlay visuals
GE_HL_PLN_EN plane enable for highlight visuals
GE_MISC_PLN_EN plane enables for the Z buffer (if enabled) plus WID, mask, and VLT context depending on the visual selected.
  Valid visuals for vector requests are 0–5 and 8. Drawing to visual 14 will give a graphics engine error. Drawing to other visuals will not generate an error; however the results in the frame buffer are not defined. Masking is guaranteed to work on all visuals, however.

Clipped Vector Request: E3ClipVec

A special purpose request is provided for X windows clipped and wide vectors. This request draws a single Bresenham stroke with provision to initialize the Bresenham error parameters and starting symbology position. The request takes a starting pixel in packed form only, and no support is provided for shading color, Z or texture. The vector is always drawn in the foreground color, at the depth specified in GE_Z (if Z buffering is enabled), and cannot be textured.

Wide Lines

X windows wide lines can be drawn using this request by multistroking with different initial Bresenham setup parameters. There is an explicit "DRAW FIRST" bit in the symbology control field. The wide line code must explicitly set this for the first stroke, and clear for subsequent strokes of the wide line.

Clipped Vectors

1) Vector starts in window and goes out:

If the vector was not part of a previous line string, reset the symbology by clearing LOAD_CUR_SYMB_H in the request and VEC_CONTIN_SYMB_H in the GCR.

If the vector is part of a linestring, clear LOAD_CUR_SYMB_H and DRAW_FIRST in the request, set VEC_CONTIN_SYMB_H in the GCR so that symbology continues across the vertex, and the first pixel is dropped.

2) Vector starts and finishes out of the window:

In this case, the symbology mask must be set to the correct position for the first drawn pixel. The correct symbology bit and repeat count must be calculated for the first pixel, and loaded by the request.

3) Vector starts outside, and finishes inside:

For standalone vectors, this case can be handled the same as the previous case. If the vector is part of a linestring, and is to be continued by a linestring request, then it should be set up as above, but 1 subtracted from the pixel count. After the clipped stroke is drawn the linestring is started with VEC_CONTIN_SYMB_H set in the GCR so symbology continues from where the clipped stroke finished. The interior vertex will only be drawn once, but as the first pixel of the linestring, rather than the last pixel of the clipped line segment.

Notes on symbology: VEC_SYMB_H is supported in the GCR—symbology can be enabled or disabled. If symbology is enabled, then symbology can be set to any required initial value by setting the symbology bit select and repeat count, and setting LOAD_CUR_SYMB_H. Note that setting the bit select and repeat count to zero is the same as resetting the symbology.

If LOAD_CUR_SYMB_H is clear, then the standard GCR bits apply. If VEC_CONTIN_SYMB_H is set, the symbology will continue from its current position, if it is clear the symbology will restart.

The registers which affect the clipped vector request are the same as those which affect the E3Vec request, except for the following:

Support for GCR bits:

| | |
|---|---|
| VEC_AA_H | must be disabled, or results are undefined |
| VEC_SEGMENT_H | ignored |
| VEC_DRAW_FIRST_H | ignored |
| VEC_DROP_LAST_H | ignored |
| FIX_VER_H | ignored |
| SHADE_FLAT_H | ignored |
| VEC_CONTIN_SYMB_H | ignored if LOAD_CUR_SYMB_H set in request, |
| COORD_OFFSET_H | ignored - offset is not supported |
| OFFSET_4R_H | ignored |

- all other bits are supported normally

| | |
|---|---|
| GE_AA_CTRL: | antialiasing is not supported |
| GE-TEX registers: | texturing is not supported |
| E3Vec | (open ended) |

Request code word:

```
1    24 23  16 15      8 7                    0
+----+-----+-----+------+---------------------+
|  0 |  1  |VCTRL| GRAPHICS CONTROL           |
+----+-----+-----+------+---------------------+
``` followed by:

```
+----+----+-----+-----+-------------+
| X,Y,[Z],[U,V,S],[R,G,B,[A]] (1–20 words) |
+----+----+-----+-----+-------------+
```

«

«

«

«

```
+----+----+-----+-----+-------------+
| X,Y,[Z],[U,V,S],[R,G,B,[A]]        |
+----+----+-----+-----+-------------+
``` terminated by:

```
+----+----+-----+-----+-------------+
|    TERMINATOR (1 or 2 words)       |
+----+----+-----+-----+-------------+
```

This request draws a single stroked linestring (polyline). if VEC_SEGMENT_H is set pairs of coordinates are drawn as disconnected segments. The data consists of a sequence of vertices followed by a terminator which is dependent on the coordinate data type. Each coordinate is an (X,Y) pair optionally followed by a Z coordinate, a texture coordinate, a color value and an alpha value.

If Z is provided Z will be interpolated along each stroke. If Z is not provided the static Z value from GE_Z will be used.

If U, v and S are provided, they will be interpolated, and used as texture coordinates by the texture processor.

If color is provided per vertex, shading will be performed, unless SHADE_FLAT_H is set in the GE_GCR in which case each stroke is drawn in the color associated with the second vertex of the stroke.

If alpha is provided it is shaded like one of the color components. If it is not, a constant alpha value from the foreground color register is used.

Symbology will applied if enabled.
If VEC_AA_H is set the line will be antialiased.
If FIX_VER_H is set, floating point X,Y coordinates are truncated before use.
If COORD_OFFSET_H is set, a 2K or 4K offset will be subtracted from the X and Y coordinates.
The source of IZ[31:00] is GE_FGCOLOR, GE_BGCOLOR or the color iterator
The source of IZ[63:32] is GE_Z or the Z iterator
E3Clipvec

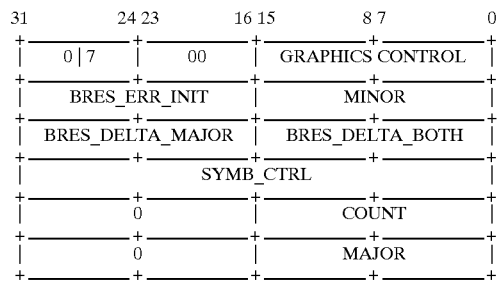

This is a special purpose request to draw clipped line segments, and aid in drawing X wide lines. It draws a single Bresenham stroke with the specified starting Bresenham parameters and symbology start point. The stroke is drawn in the current foreground color. If Z buffering is enabled the static Z value in GE_Z is used.
Request Data is as Follows

| | |
|---|---|
| MAJOR | major axis position of first pixel to be drawn, window relative |
| MINOR | minor axis position of first pixel to be drawn, window relative |
| COUNT | Bresenham iteration count (maximum = 4k − 1) |
| BRES_ERR_INIT | initial Bresenham error - this should be loaded with the error term corresponding to the position of the first pixel - ie at the MAJOR,MINOR position specified in the request. |
| BRES_DELTA_MAJOR | Bresenham error increment for a move in the major axis |
| BRES_DELTA_BOTH | Bresenham error increment for a move in the both axes |

SYMB_CTRL controls symbolization of the line, including current symbology position, whether the first pixel is drawn or not and octant.

| | | |
|---|---|---|
| bits 4:0 | CUR_SYMB | 5 bit value to select the first bit in the symbology mask to be used. 0 = use bit 0, 1 = use bit 1, etc. Setting this bit to a value greater than SYMB_COUNT in GE_SYMB_CTRL will give undefined results. |
| bits 7: | reserved, MBZ | |
| bits 15:8 | CUR_SYMB_REPEAT | current value of the repeat counter. This counter counts up to the value in SYMB_REPEAT in GE_SYMB_CTRL. Setting this to a value greater than or equal to SYMB_REPEAT in GE_SYMB_CTRL will give |

-continued

| | | |
|---|---|---|
| | | undefined results. |
| bit 16 | LOAD_CUR_SYMB_H | set to load the iterator current symbology bit select and repeat count with the data in the above fields. If clear then the symbology will either continue from the current value, or be reset depending on VEC_CONTIN_SYMB_H in GE_GCR. |
| bit 17 | DRAW_FIRST_H | if set, draw the first pixel, if clear the first pixel will not be drawn (and symbology won't be advanced). |
| bit 18 | MINOR_NEG_H | set if the delta in the minor axis is negative |
| bit 19 | MAJOR_NEG_H | set if the delta in the major axis is negative |
| bit 20 | MAJOR_Y_H | set if Y is the major axis, clear if X is the major axis |
| bits 31:21 | reserved, MBZ | |

COORD_OFFSET_H is ignored for this request.
Note that VEC_DRAW_FIRST_H and VEC_DROP_LAST_H in the GCR are ignored, thus there is no support for DROP LAST. The same effect can be obtained by decrementing the COUNT field.
Also DRAW FIRST H defined here applies independently of VEC_CONTIN_SYMB_H in the GCR, as opposed to the behavior of VEC_DRAW_FIRST_H in the GCR.
The source of IZ[31:00] is GE_FGCOLOR or GE_BGCOLOR
The source of IZ[63:32] is GE_Z Triangle Request
The triangle request is open ended and accepts a stream of vertices. After the first two vertices a triangle is drawn between each new vertex and the previous two vertices.
Pixelization uses the "top left" rule. All pixels whose center falls within the triangle boundary are drawn. Pixels whose center fall exactly on the triangle boundary are drawn if they are on a left hand edge, or a horizontal top edge. They are not drawn if they fall on a right hand edge or a horizontal bottom edge.
Note on using triangles for X wide lines:
The problem with drawing wide lines (with butt ends) as two triangles is pixelization of boundary points. All points completely inside a rectangle must be drawn. This is OR. However boundary pixels appear to be a problem. X specifies that boundary pixels are drawn if the body of the line is below or to the right of the pixel. Triangles have the rules specified above, and hence boundary pixelization is not necessarily the same for the two.
For lines which are horizontal or vertical, two triangles give the correct pixelization.
For lines with positive slope (ie top left->bottom right, since origin is top left), pixelization is also correct.
Lines with negative slope have potentially incorrect pixelization on the top and bottom—the bottom edge will include the "on" pixels, while the top edge will exclude them. This is because the "top" edge of the line is a "right" edge of one of the triangles. The left and right edges of the line will be correct.
Possibilities
    use two triangles if slope>=0, else use software
    use two triangles to draw the "body" of the line (a parallelogram) and use software to draw the two small triangles on the top and bottom.
    a combination of the above two use two triangles and shift the rectangle a tiny amount in an upwards direction in the direction of the line segment The registers which affect triangle requests are the same as for vector requests, except for the following:

GE_GCR
   VEC *** bits are ignored
   BG_WE_H is unused
GE_AA_CTRL antialiasing not provided for triangles
   the symbology registers are ignored

What is claimed is:

1. An improved device, of the type utilizing a display having pixels identified by a two-axis coordinate system, so that each pixel lies at the intersection of a coordinate line from each of the axes, for displaying a line segment having arbitrary endpoints referenced to the same coordinate system, the display operating under control of a digital computer, wherein the improvement comprises:

(a) means for determining as a major axis the axis of the coordinate system with respect to which the line moves most, and for defining the other one of the axes as the minor axis;

(b) intersection means for identifying the major coordinate lines, if any, crossing the line segment to be displayed, based only upon the major axis coordinates of the endpoints of the line segment; and (c) pixel selection means for, with respect to each crossing found by the intersection means, selecting for display a pixel that both (i) lies on the major axis coordinate line at the crossing and (ii) has a minor axis coordinate that is closest to the line segment.

2. A device according to claim 1, wherein the pixel selection means includes means for, in the course of determining the pixel having a minor axis coordinate that is closest to the line segment, breaking a tie between two pixels by making a determination, in accordance with a uniform rule, to select for display one of them.

3. A device according to claim 1, further comprising:

(e) means for processing a line segment found to start or finish exactly on the major coordinate line of a pixel, so that there is no crossing of such coordinate line with the line segment, by applying a second uniform rule to determine whether to select the pixel for display.

4. A device according to claim 2, further comprising:

(e) means for processing a line segment found to start or finish exactly on the major coordinate line of a pixel, so that there is no crossing of such coordinate line with the line segment, by applying a second uniform rule to determine whether to select the pixel for display.

5. A device according to claim 3, wherein the second uniform rule includes selecting for display one of the first and last pixels of a line segment except in a case where the line segment is isolated and in a case where the line segment is at a specified end of a series of connected segments.

6. A method utilizing a display having pixels identified by a two-axis coordinate system, so that each pixel lies at the intersection of a coordinate line from each of the axes, for displaying a line segment having arbitrary endpoints referenced to the same coordinate system, the display operating under control of a digital computer, the method comprising:

(a) determining as a major axis the axis of the coordinate system with respect to which the line moves most, and for defining the other one of the axes as the minor axis;

(b) identifying the major coordinate lines, if any, crossing the line segment to be displayed, based only upon the major axis coordinates of the endpoints of the line segment; and (c) with respect to each major axis coordinate line found in step (b), selecting for display a pixel that both (i) lies on the major axis coordinate line at the crossing and (ii) has a minor axis coordinate that is closest to the line segment.

7. A method according to claim 6, further comprising:

(d) in the course of determining under step (c) the pixel having a minor axis coordinate that is closest to the line segment, breaking a tie between two pixels by making a determination, in accordance with a uniform rule, to select for display one of them.

8. A method according to claim 6, further comprising:

(e) if in relation to determining under step (b) the places where the major coordinate line of a pixel crosses the line segment to be displayed, a line segment is found to start or finish exactly on the major coordinate line of a pixel, so that there is no crossing of such coordinate line with the line segment, thereupon applying a second uniform rule to determine whether to select the pixel for display.

9. A method according to claim 7, further comprising:

(e) if in relation to determining under step (b) the places where the major coordinate line of a pixel crosses the line segment to be displayed, a line segment is found to start or finish exactly on the major coordinate line of a pixel, so that there is no crossing of such coordinate line with the line segment, thereupon applying a second uniform rule to determine whether to select the pixel for display.

10. A method according to claim 9, wherein the second uniform rule includes selecting for display one of the first and last pixels of a line segment except in a case where the line segment is isolated and in a case where the line segment is at a specified end of a series of connected segments.

11. A method utilizing a display having pixels identified by a two-axis coordinate system, so that each pixel lies at the intersection of a coordinate line from each of the axes, for displaying a line segment having arbitrary endpoints referenced to the same coordinate system, the display operating under control of a digital computer, the method comprising:

(a) determining as a major axis the axis of the coordinate system with respect to which the line moves most, and for defining the other one of the axes as the minor axis;

(b) identifying all the major coordinate lines, if any, crossing the line segment to be displayed, based only upon the major axis coordinates of the endpoints of the line segment prior to selecting any pixel for display of the line segment; and (c) with respect to each major axis coordinate line found in step (b), selecting for display a pixel that both (i) lies on the major axis coordinate line at the crossing and (ii) has a minor axis coordinate that is closest to the line segment.

12. A method utilizing a display having pixels identified by a two-axis coordinate system, so that each pixel lies at the intersection of a coordinate line from each of the axes, for displaying a line segment having arbitrary endpoints referenced to the same coordinate system, the display operating under control of a digital computer, the method comprising:

(a) choosing as a major axis the axis of the coordinate system with respect to which the line moves most, and for defining the other one of the axes as the minor axis;

(b) determining whether any major coordinate lines cross the line segment to be displayed, based only upon the major axis coordinates of the endpoints of the line segment; and (c) examining a major axis point for selecting for display a pixel that both (i) lies on the major axis coordinate line at the crossing and (ii) has a minor axis coordinate that is closest to the line segment, if and only if at least one major axis coordinate line has been found in step (b) to cross the line segment to be displayed.

* * * * *